United States Patent [19]

Omitsu

[11] Patent Number: 4,612,827
[45] Date of Patent: Sep. 23, 1986

[54] ACCELERATOR CONTROL FOR A VEHICULAR PROPULSION SYSTEM HAVING A CONTINUOUSLY VARIABLE RATIO TRANSMISSION

[75] Inventor: Takashi Omitsu, Madison, Wis.

[73] Assignee: Aisin Seiki Kabushiki Kaisha, Japan

[21] Appl. No.: 595,481

[22] Filed: Mar. 30, 1984

[51] Int. Cl.⁴ .............................................. B60K 41/16
[52] U.S. Cl. ........................................ 74/866; 74/865; 74/877; 364/424.1
[58] Field of Search ................. 74/866, 877, 861, 865; 363/424.1

[56] References Cited

U.S. PATENT DOCUMENTS

| | | | |
|---|---|---|---|
| 3,893,344 | 7/1975 | Dantlgraber et al. | 74/867 X |
| 4,253,347 | 3/1981 | Mizuno et al. | 74/866 X |
| 4,261,229 | 4/1981 | Mizuno et al. | 74/866 |
| 4,281,567 | 8/1981 | Maurer | 74/866 |
| 4,458,560 | 7/1984 | Frank et al. | 74/877 X |
| 4,459,878 | 7/1984 | Frank | 74/877 X |

FOREIGN PATENT DOCUMENTS

| | | | |
|---|---|---|---|
| EP-88925 | 9/1983 | European Pat. Off. | 74/866 |
| 3144845 | 12/1982 | Fed. Rep. of Germany | 364/424.1 |
| 99546 | 6/1983 | Japan | 74/866 |
| WO79/00781 | 10/1979 | PCT Int'l Appl. | 74/866 |

Primary Examiner—Kenneth J. Dorner
Assistant Examiner—Dwight G. Diehl
Attorney, Agent, or Firm—Banner, Birch, McKie & Beckett

[57] ABSTRACT

A control system and method for a vehicular propulsion system which includes a continuously variable ratio transmission (CVT) and an engine having a relatively steep torque-speed characteristic. Attenuation of the accelerator pedal output—which directly controls the transmission ratio—when the engine is operating in the highly sensitive "critical speed range" spanning the steep portion of its torque-speed characteristic, serves to smooth vehicle responsiveness and driveability, and improve control.

14 Claims, 7 Drawing Figures

TRANSMISSION RATIO CHANGE

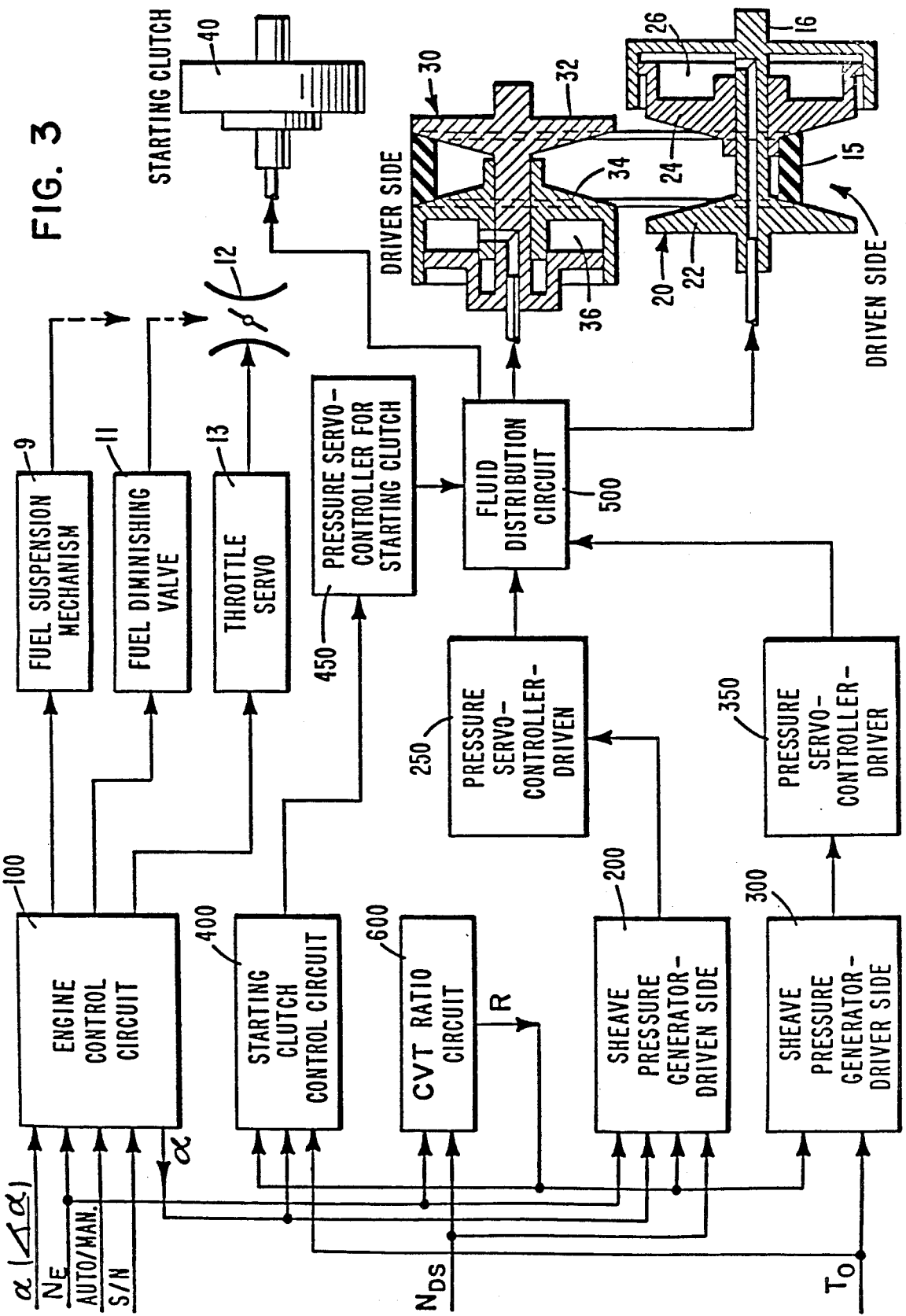

SHEAVE ACTUATING CURVES

FIG. 5
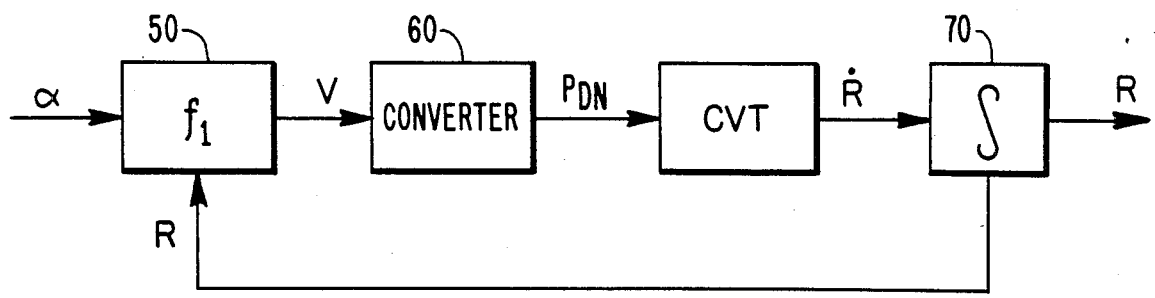
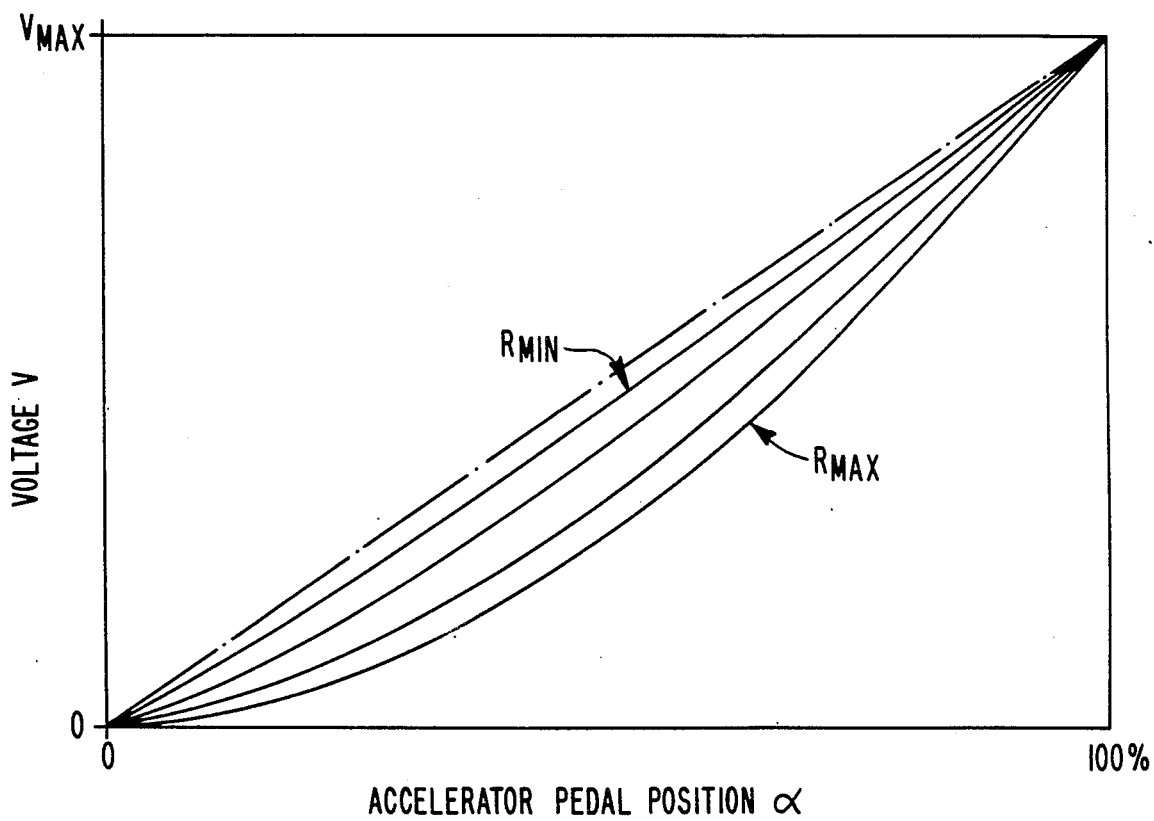
FIG. 6
ATTENUATING FUNCTION $f_1$

ACCELERATOR CONTROL FOR A VEHICULAR PROPULSION SYSTEM HAVING A CONTINUOUSLY VARIABLE RATIO TRANSMISSION

BACKGROUND OF THE INVENTION

This invention relates to a vehicle propulsion system having a continuously variable ratio transmission and, more particularly to a control system and a control method for such a propulsion system.

The quest for greater fuel economy of automotive vehicles has led to significant improvements in engine and transmission design and control. Continuously variable ratio transmissions (CVT) have shown particular promise in this regard. It will be appreciated that at any given vehicle speed, and for any need propulsive force, a certain transmission ratio will provide maximum fuel economy for a given engine. In addition, for any given vehicle speed, one transmission ratio will permit maximum acceleration with that engine. Since a CVT with the proper ratio range can provide any desired transmission ratio, it is obviously attractive for automobiles from the standpoint of economy, low emissions and performance. If the mechanical efficiency of the CVT is high and its ratio range is wide enough, it can even be possible to have both maximum economy and maximum performance in the same vehicle. Among the obvious benefits are fully automatic operation, smooth, stepless and rapid response to driver demand, and quieter crusing.

Many different CVT configurations have been developed in the prior art. These include, for example, hydrostatic transmissions; rolling contact traction drives; overrunning clutch designs; electrics; multi-speed gear boxes with slipping clutch; and V-belt traction drives. Of these the V-belt traction drives appear attractive for small to medium size passenger car applications because of their compactness, lightness and simplicity of design. Basically, this type of CVT comprises a V-belt which interconnects a driver sheave and driven sheave, the diameters of the sheaves being variable to change the ratio of the CVT. Recent advances in belt design have resulted in improved belt durability and longevity. If sheave movement can be properly controlled so as to avoid undue stress on the belt, it is expected that a very long belt life can be achieved.

Many control schemes have been devised for engine-CVT systems in attempts to maximize fuel economy. These have been based on empirical analyses of individual engine performance, and the realization that, for any desired power output, there is an optimum combination of engine speed and torque which will result in minimum fuel consumption. This is illustrated in FIG. 1.

FIG. 1 is a typical performance map of a four cylinder spark ignition passenger car engine having a displacement of approximately 2.5 liters. The map is a plot of engine torque $T_E$ and brake horsepower BHP as a function of engine speed $N_E$. The dot-dash line near the top of the map is a plot of engine torque at full throttle. The series of curves in solid black lines are fuel consumption contours, indicating constant brake specific fuel consumption (BSFC) in 1 b.M/BHP-hr. Minimum fuel consumption occurs at a point designated by 0.4 pounds per horsepower-hour. The series of dashed lines indicates power output of the engine. The ideal operating line for low fuel consumption is indicated by the heavy solid line $f(N_E)$, this curve being a function of engine speed. The ideal operating line for low fuel consumption is purely a function of engine characteristics and is optimal regardless of vehicle road speed. Other ideal operating lines may appear on the performance map, for example, the ideal operating line for low emissions.

In a vehicle with a conventional, manually shifted gearbox, forward speed ratios usually are available in only four or five steps. The operating point of the engine on the performance map is determined by drive shaft speed, power or torque commanded, and transmission gear ratio. Since there are only a few gear ratios available in a typical transmission, the engine must be throttled much of the time. The engine must therefore operate most of the time at high BSFC values. In contrast, a CVT is able to vary its speed ratio continuously to allow the engine to run at wider throttle and lower BSFC values.

Perhaps the most difficult task demanded of a control system for an engine-CVT system is to maintain engine operation along the ideal operating line. This is due to the almost continuous transient nature of operation of an automotive vehicle, there being hardly ever a time when road load and commanded torque or power remain constant. Transient conditions usually are dealt with by a change in CVT ratio, engine speed and throttle. Prior art control systems, by their very nature, permit an excursion of engine operation away from the ideal operating line before returning back to it at steady state. An example of such an excursion is shown in FIG. 1 by dashed line X-Y-Z. The result is that engine operation approaches, but hardly ever is maintained on the ideal operating line.

In virtually all prior art engine-CVT control systems, throttle position is controlled directly by the vehicle accelerator pedal, or is a direct function of pedal position, as well as other parameters. Engine and transmission control usually are directly related to one another. Such control schemes permit engine operation during transients to vary from the ideal operating line. Excursions away from the ideal operating line result in less than optimum engine operation (e.g., excessive fuel consumption, or excessive emissions), until effective control is resumed by the system during steady state operation. As pointed out earlier, however, most vehicular operation is transient in nature, rather than steady state, so that substantially all engine operation occurs off the ideal operating lne. Emissions calibrations must therefore be made in a substantial portion of the engine performance map. Most prior art control systems also must be specifically tailored to particular engines. This requires numerous specifically designed control systems for a fleet of differently powered vehicles. In addition, most prior art control systems cannot compensate for varying engine conditions, the result being vehicle driveability which varies with engine temperature, state of tune, age and altitude. Close duplication of conventional vehicle characteristics also is a problem with prior art CVT control schemes.

Commonly assigned and copending U.S. application Ser. No. 380,922, filed May 21, 1982 (now U.S. Pat. No. 4,459,878)—which is incorporated herein by reference—discloses an elegant solution to the above-noted problems inherent in prior art engine-CVT control systems. Briefly, the control scheme disclosed therein involves totally independent engine and transmission control. That is, the position of the engine throttle is totally independent of accelerator pedal position. Throttle position and, hence, engine output torque simply is a function of engine speed only, and that function may be any desired relationship, for example, the ideal operating line for low fuel consumption, the ideal operating line for low emissions, or a compromise ideal operating line for low fuel comsumption and low emissions. Torque, power or other desired performance parameters commanded by the accelerator pedal controls CVT ratio, and engine speed is determined by the load placed thereon, which is a function of road load and CVT ratio. Hence, throttle position is precisely adjusted in accordance with the ideal function for any load placed on the engine. With appropriately designed controls, anomalous engine and vehicle behavior, such as engine overspeed and underspeed conditions, can be prevented, transient start-up from rest can be accommodated, and the vehicle can be made to perform almost in all respects just as a vehicle with a conventional automatic transmission. This control scheme is described below in greater detail.

It has been found that, due to inherent engine characteristics, the driveability and control of a vehicle governed by such a control scheme may be less than optimum. That is, the "feel" of the vehicle at certain engine speeds in response to accelerator pedal inputs may not closely enough approximate the feel of a vehicle with a conventional automatic transmission. Specifically, unless accelerator pedal movements are smoothly and meticulously controlled by the driver at these engine speeds, the vehicle may tend to buck and lurch, and the engine may tend to speed up too quickly upon acceleration and run to fast.

The problem is caused by the relatively steep nature of the engine torque-speed characteristic or curve of most engines, close to or along which engine operation desirably takes place. The problem tends to be prevalent in the case of many normally aspirated spark-ignition internal combustion engines, which inherently have relatively steep torque-speed characteristics at low engine speeds. An example of this is illustrated by the ideal operating line $f(N_E)$ in the plot of FIG. 1. In the example shown, a significant proportion of engine operation occurs at speeds below 1600 rpm, especially in the case of urban driving at low to moderate road speeds. In this "critical" engine speed range, a slight deviation in engine speed results in a large change in engine torque, meaning that vehicle movement is very sensitive to accelerator pedal input. This sensitivity is heightened at higher transmission ratios—such as during start-up from rest—because engine torque is multiplied to a greater degree before reaching the driving wheels of the vehicle.

SUMMARY OF THE INVENTION

It is therefore an object of the present invention to overcome the above-noted problems of driveability and control of a CVT vehicle having an engine with a relatively steep torque-speed characteristic by providing a control scheme which makes vehicle movement less sensitive to accelerator pedal inputs when the engine is operating in the critical speed range defined by the steep torque-speed characteristic.

Another object of the invention is to provide such a control scheme which still enables the vehicle propulsion system to deliver maximum power and torque when commanded by the accelerator pedal.

Another object of the invention is to provide such a control scheme which still permits the engine to operate as close as possible to a desired torque-speed curve.

These and other objects of the invention are accomplished by providing a system for controlling the operation of the aforementioned type of vehicular propulsion system, which includes command means operatively coupled to the transmission and providing an input thereto for controlling the transmission ratio. The control system comprises attenuator means operatively interconnecting the command means and the transmission for attenuating the output of the command means within the critical speed range, thereby decreasing the sensitivity of the command means and smoothing the responsiveness of the propulsion system. A corresponding control method also is comtemplated.

In order to enable the propulsion system to deliver maximum power and torque when commanded to do so, the attenuation of the output of the command means diminishes and approaches substantially zero as the output of the command means approaches a maximum. A parabolic function is but one function which defines a suitable attenuation characteristic.

For convenience, the invention is described by way of example in the context of a spark-ignition, internal combustion engine-CVT propulsion system for an automotive vehicle, governed by a specific control scheme. It is to be understood, however, tht the principles of the invention are equally applicable to any type of CVT vehicle propulsion system, including but not limited to internal combustion engines of any design, and other control schemes. Where the term "throttle" is used, the term is understood to encompass any mechanism for controlling the delivery of fuel to the engine, be it a conventional carbureted spark-ignition engine wherein fuel flow varies with throttle butterfly position, a fuel injected spark-ignition or diesel engine, and so on.

BRIEF DESCRIPTION OF THE DRAWINGS

The novel features of the invention are set with particularity in the appended claims, but the invention will be understood more fully and clearly from the following detailed description of the invention as set forth in the accompanying drawings, in which:

FIG. 3 is a schematic illustration showing the entire control system for the control scheme of FIG. 2 and its relationship to the CVT sheave and belt drive, and the vehicle starting clutch;

FIG. 5 is a schematic representation of the attenuating transmission ratio control scheme according to the invention;

FIG. 6 is a plot of the attenuating function $f_1$ for various transmission ratios.

DETAILED DESCRIPTION

1. Exemplary Engine-CVT Control Scheme

Figure 2:
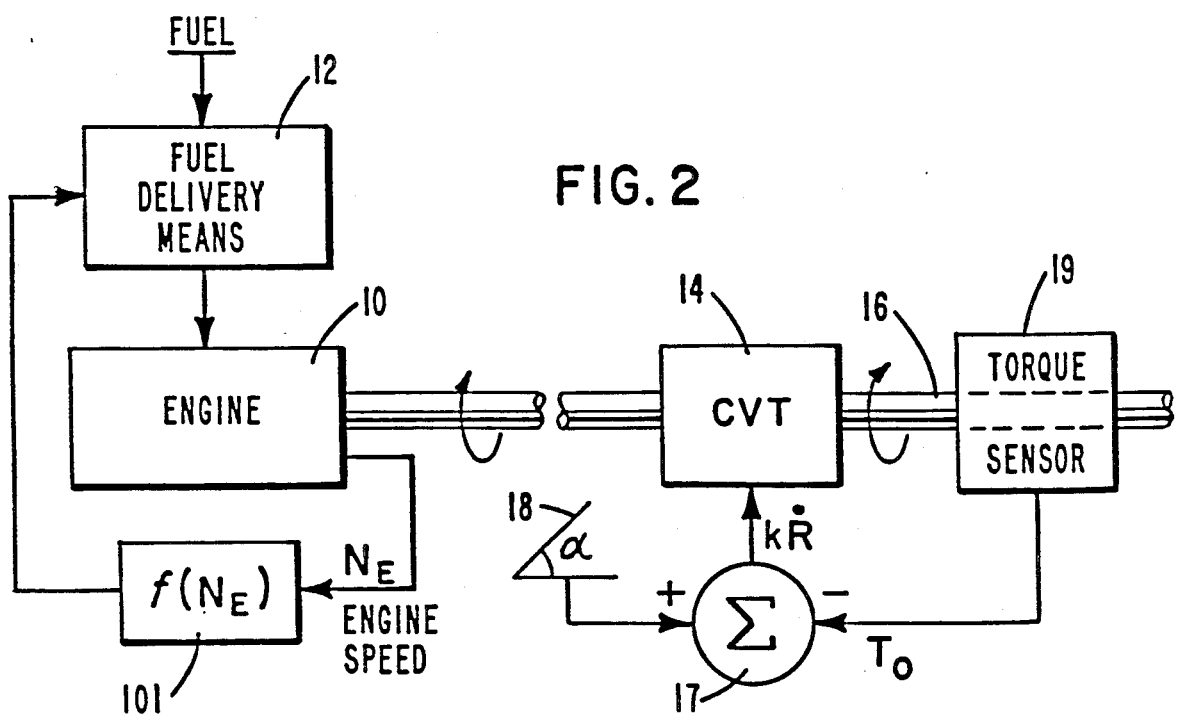
FIG. 2 is a schematic illustration showing the functional relationship of the components of an engine-CVT control scheme according to the aforesaid commonly assigned U.S. Pat. No. 4,459,878.

FIG. 2 illustrates the functional relationship of the components of an engine-CVT control scheme according to U.S. Pat. No. 4,459,878. An engine 10 is drivingly coupled to a continuously variable ratio transmission (CVT) 14 through a clutch or fluid coupling (not shown). Fuel is fed to engine 10 by a fuel delivery means 12, which may be the throttle and fuel jets of a conventional carburetor, a fuel injection system or the like. CVT 14 may be one of the many types of known continuously variable ratio transmissions. Output shaft 16 delivers power and torque from the engine and CVT. The ratio of the CVT is set by a CVT ratio controller 17, which generates a rate of change of ratio signal kR as a function of output torque $T_0$ measured by torque sensor 19 and commanded power or torque $\alpha$ commanded by accelerator pedal 18. Other parameters indicative of engine-CVT system performance may be used by ratio controller 17 to effect a change of CVT ratio in a similar manner. For example, rather than using desired output power or torque and measured actual output torque, commanded and measured vehicle acceleration, output shaft acceleration, or other parameters could be used. In this embodiment, however, CVT ratio is strictly a function of commanded power or torque and measured output torque, and is completely independent of engine operation. Engine control, on the other hand, is provided by an engine controller 100 which adjusts fuel delivery means 12 in accordance with measured engine speed $N_E$. This relationship may desirably be the ideal engine operating line for low fuel consumption, the ideal operating line for low emissions, a compromise of the two, or any other desired engine operating characteristic.

FIG. 3 schematically illustrates the entire control system in greater detail. The particular type of CVT illustrated in FIG. 3 is the variable diameter pulley, V-belt traction drive type having a driven sheave 20 connected to output shaft 16 and a driver sheave 30 which is coupled to engine 10. Belt 15 interconnects sheaves 20 and 30 to transmit motive power therebetween. Sheaves 20 and 30 are hydraulically actuated by pressurized fluid to vary the driving diameters. Sheave 20 has an axially fixed portion 22 and an axially movable portion 24. Pressurized fluid in a fluid chamber 26 behind movable portion 24 provides the axial force required to maintain portions 22 and 24 at a fixed distance from one another (i.e., to hold the driving diameter of sheave 20 constant), and to move portion 24 toward or away from portion 22 to vary the driving diameter. Similarly, sheave 30 has an axially fixed portion 32 and a movable portion 34 which is under the influence of fluid pressure in chamber 36. Poper pressures in chambers 26 and 36 to keep belt 15 under proper tension are maintained by the control system, as described below.

The position of throttle (fuel delivery means) 12 is controlled by a throttle servo 13 which receives signals from engine control circuit 10. During certain transient operations fuel delivery may be diminishing by a fuel diminished valve 11, or fuel delivery may be suspended completely by a fuel suspension mechanism 9. The fuel diminishing and suspension functions may be performed, for example, by a single solenoid valve operable in variable modes. Engine control circuit 100 is responsive to inputs from the accelerator pedal ($\alpha$), engine speed ($N_E$), a manual override switch which permits operation in the automatic or manual mode, and a start/neutral switch (S/N) which insures that the vehicle will remain stationary when the engine is started.

Fluid pressure for activating the driven sheave is provided by a sheave pressure generator 200 which acts through a pressure servo controller 250 and a fluid distribution circuit 50. Similarly, fluid pressure for activating the driver sheave 30 is provided by sheave pressure generator 300 acting through a servo controller 350 and fluid distribution circuit 500. Pressure generator 200 is responsive to inputs of engine speed $N_E$, accelerator position $\alpha$, drive shaft speed $N_{DS}$ measured by a sensor associated with drive shaft 16, and CVT ratio R. Ratio R is generated by CVT ratio circuit 600 and is the quotient of engine speed $N_E$ divided by drive shaft speed $N_{DS}$.

A starting clutch 40 is provided which couples engine 10 and CVT 14. Clutch 40 is disengaged when the vehicle is stationary, and is partially engaged during slow vehicle operation, gradually approaching full engagement, which occurs at a predetermined point of operation. Starting clutch 40 is controlled by a control circuit 400 which is responsive to accelerator pedal position $\alpha$, engine speed $N_E$ and the auto/manual switch, through servo controller 450 and fluid distribution circuit 500.

Figure 4:
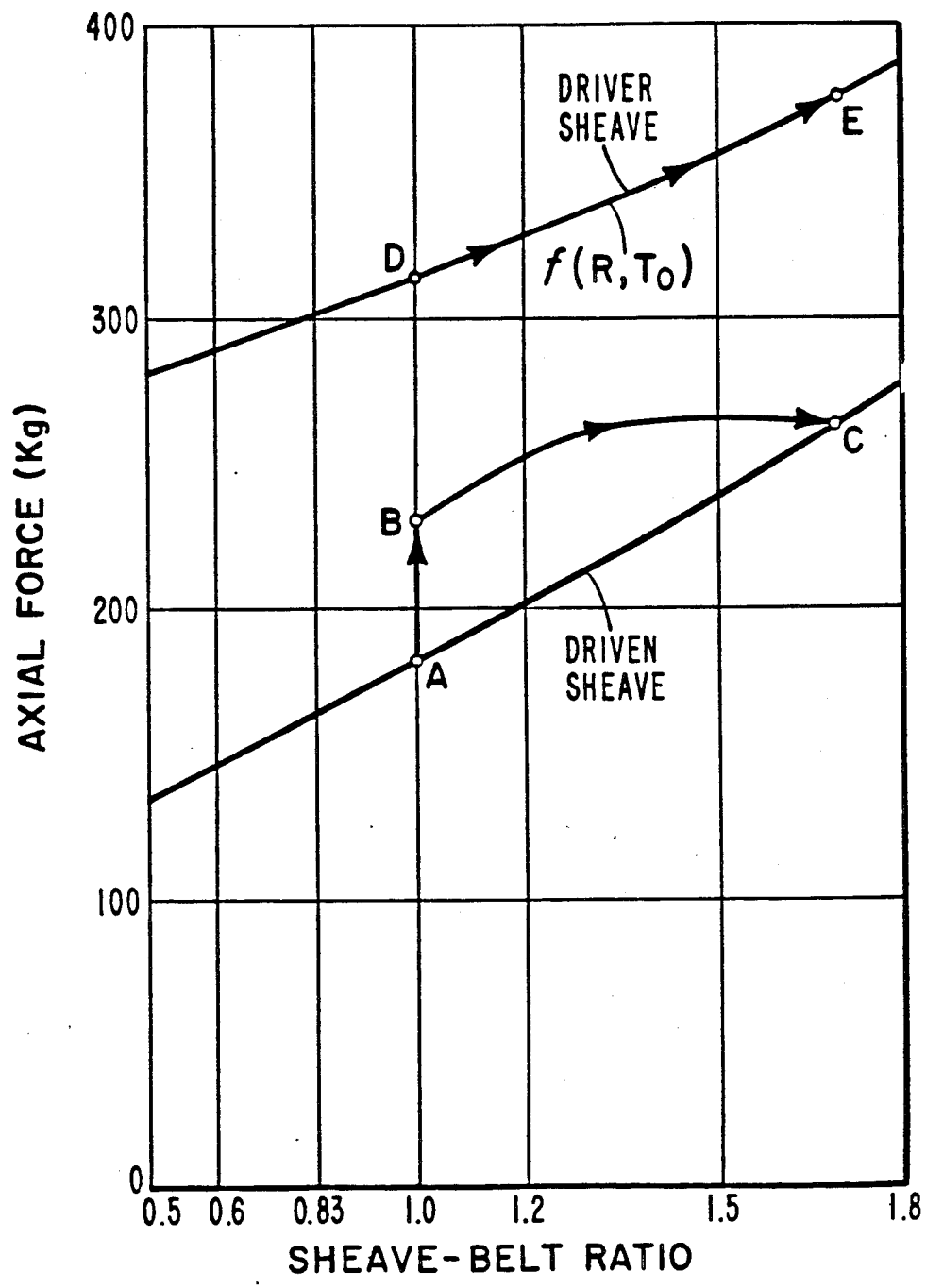
FIG. 4 is a graph which shows the forces applied to the driver and driven sheaves of the CVT of FIGS. 2 and 3 as a function of transmission ratio.

Referring to FIG. 4, the mechanics of a change in CVT ratio now will be described with reference to the axial forces produced by the pressurized fluid in chambers 26 and 36. The lower curve in FIG. 6 is a plot of steady state axial force on movable portion 24 of driven sheave 20 as a function of CVT ratio. Similarly, the upper curve is a plot of steady state axial force tending to resist inward movement of movable portion 34 as a function of CVT ratio. As described below, when for example a signal is generated to increase the ratio of the CVT from 1.0 to approximately 1.7, the fluid pressure in chamber 26 is increased to raise the axial force from approximately 175 kg. to, ultimately, approximately 270 kg. Movable portion 24 does not move instantaneously, however, due to the inertia of the system. Accordingly, the curve which represents the transient change taking place in sheave 20 is defined by movement from point A to point B at a constant ratio of 1.0, and then to point C where equilibrium is reached. Correspondingly, an increase in pressure in chamber 36 of drive sheave 30 results in an increase in axial force on movable portion 34 of sheave 30 from approximately 315 kg. (point D) to approximately 380 kg. (equilibrium point E). Despite this increase in axial force, the increased tension on belt 15 occasioned by expansion of the diameter of sheave 20 forces the two portions 32, 34 of sheave 30 apart so that sheave 30 has a smaller drive diameter. Driver sheave 30, therefore, follows in a controlled manner any changes occurring to driven sheave 20.

Sheave pressure generator 300 generates a pressure appropriate for driver sheave 30 as a function of ratio R and measured output torque $T_0$. This function has been found to satisfactorily tension belt 15, without undue stress, and effect a smooth change of ratio. An example of a function suitable for this purpose is as follows:

$$P_{DR} = K_1(K_2/R + K_3)T_0$$

where $P_{DR}$ is the fluid pressure in chamber 36 of driver sheave 30, and $K_1$, and $K_2$ and $K_3$ are appropriately selected constants.

The above-described control scheme quite simply and effectively accomplishes its primary objective of maintaining engine operation along the ideal operating line, for example, that of minimum fuel consumption. Transmission control requires output torque and accelerator pedal position sensing, while engine control requires only engine speed sensing. The specific parameter values set forth in the embodiment described above merely are exemplary, it being apparent that these parameters will vary in accordance with engine, transmission and vehicle design, and desired behavior and performance.

2. Inventive Control Scheme for Engines With Relatively Steep Torque-Speed Characteristics FIG. 5 illustrates the attenuating transmission ratio control scheme according to the invention, and demonstrates that attenuation is a function of the accelerator pedal output $\alpha$ and transmission ratio R. As explained below in connection with FIG. 6, attenuation of the accelerator pedal output involves an effective reduction of the input to the CVT below that which would obtain in the absence of this inventive attenuating control scheme. For any given accelerator pedal position and transmission ratio, attenuator 50 produces an output voltage V in accordance with attenuating function $f_1$, which is graphically illustrated in FIG. 6. Electrohydraulic converter 60 generates an hydraulic pressure $P_{DN}$ which is proportional to voltage V. Hydraulic pressure $P_{DN}$ is applied to the driven sheave 20 of the CVT to control the ratio thereof. If this control scheme is applied to the engine-CVT control system illustrated in FIG. 2, the transmission ratio R will vary as a function of driven sheave pressure $P_{DN}$ and sensed output torque $T_0$, the attenuating circuitry 50 being included within ratio controller 17. The rate of change of transmission ratio R is converted to a ratio signal R in an integrator 70, and is fed back to attenuator 50.

FIG. 6 illustrates the attenuating function $f_1$ for a variety of transmission ratios which range from the minimum transmission ratio $R_{MIN}$ to the maximum transmission ratio $R_{MAX}$. In the examples illustrated, the attenuating function is parabolic in nature, and is given by the formula:

$$V = \frac{1}{K_1 - R} \cdot a(\alpha + K_1 - 1 - R)$$

where,
V = output voltage of attenuator 50;
R = transmission ratio;
$\alpha$ = accelerator pedal output (%); and
$K_1$ = an appropriately selected constant.

The above is only one example of a suitable attenuating function, it being clear that other parabolic or nonparabolic attenuating functions may be used to achieve similar results.

The dot-dash line in FIG. 6 represents the unattenuated relationship between voltage V and accelerator pedal position $\alpha$. Regardless of the transmission ratio, maximum voltage will be applied to converter 60 when accelerator pedal position $\alpha$ is at a maximum. Attenuation of the accelerator pedal output thus approaches zero when accelerator pedal position $\alpha$ approaches 100 percent. This ensures that the full power and torque of the vehicle propulsion system will be available when needed, just as though this attenuating control system were not present.

Figure 7:
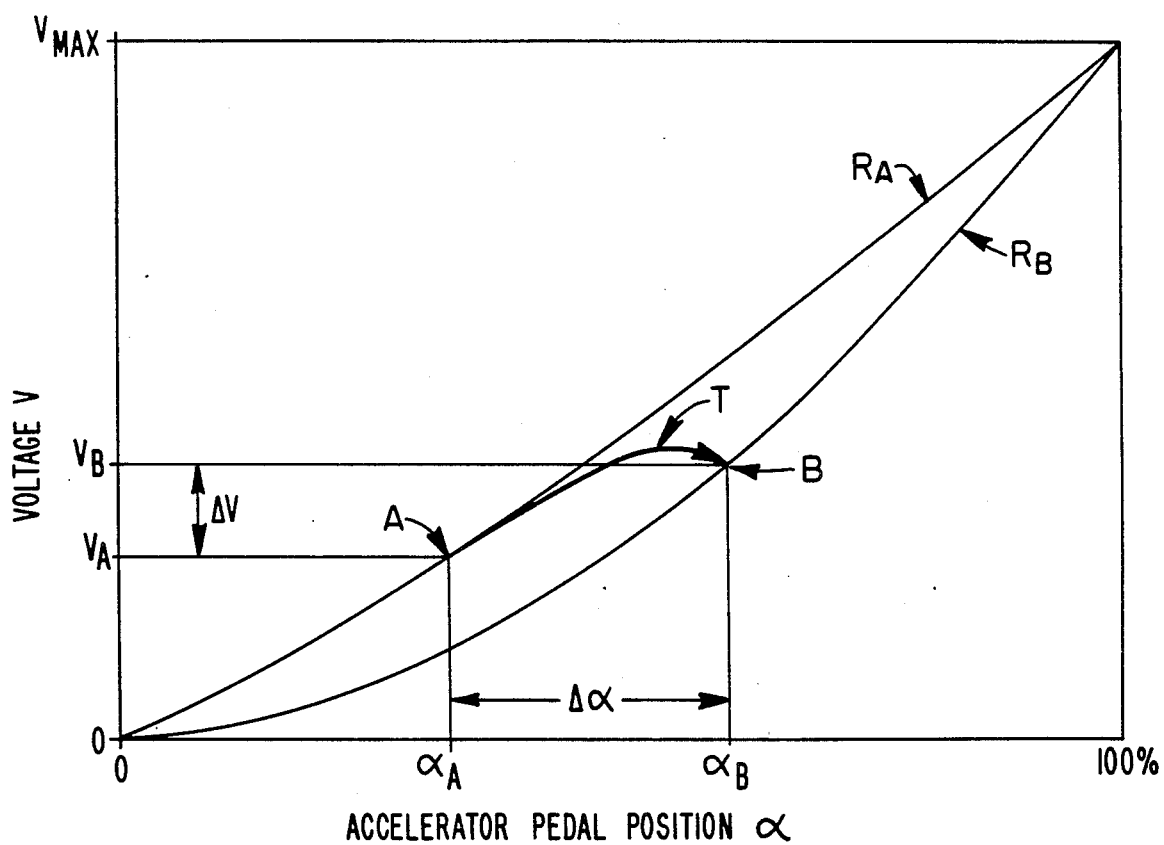
FIG. 7 is a plot illustrating the change in transmission ratio in accordance with the attenuating function when the accelerator pedal position changes.

FIG. 7 graphically illustrates how the transmission ratio changes in response to an increase in the commanded power or torque, i.e., a further depression of the accelerator pedal. The initial point of operation A of the system is defined by initial accelerator pedal position $\alpha_A$ and initial voltage $V_A$, along ratio curve $R_A$. The final point of operation B is defined by final accelerator pedal position $\alpha_B$ and final voltage $V_B$, along ratio curve $R_B$. Due to inertia of the belt and sheaves in the CVT, the initial portion of the trajectory T is more or less tangential to ratio curve $R_A$, the trajectory rising above the steady state voltage $V_B$ corresponding to final accelerator pedal position $\alpha_B$. As the transmission ratio begins to change, the trajectory levels off, eventually terminating at final point B when the driven sheave pressure $P_{DN}$ drops below its initially inflated value (owing to the inertia of the system). This inherent drop in pressure tends to inhibit any overspeed tendency of the engine due to the increase in transmission ratio and resultant decrease in load.

Figure 1:
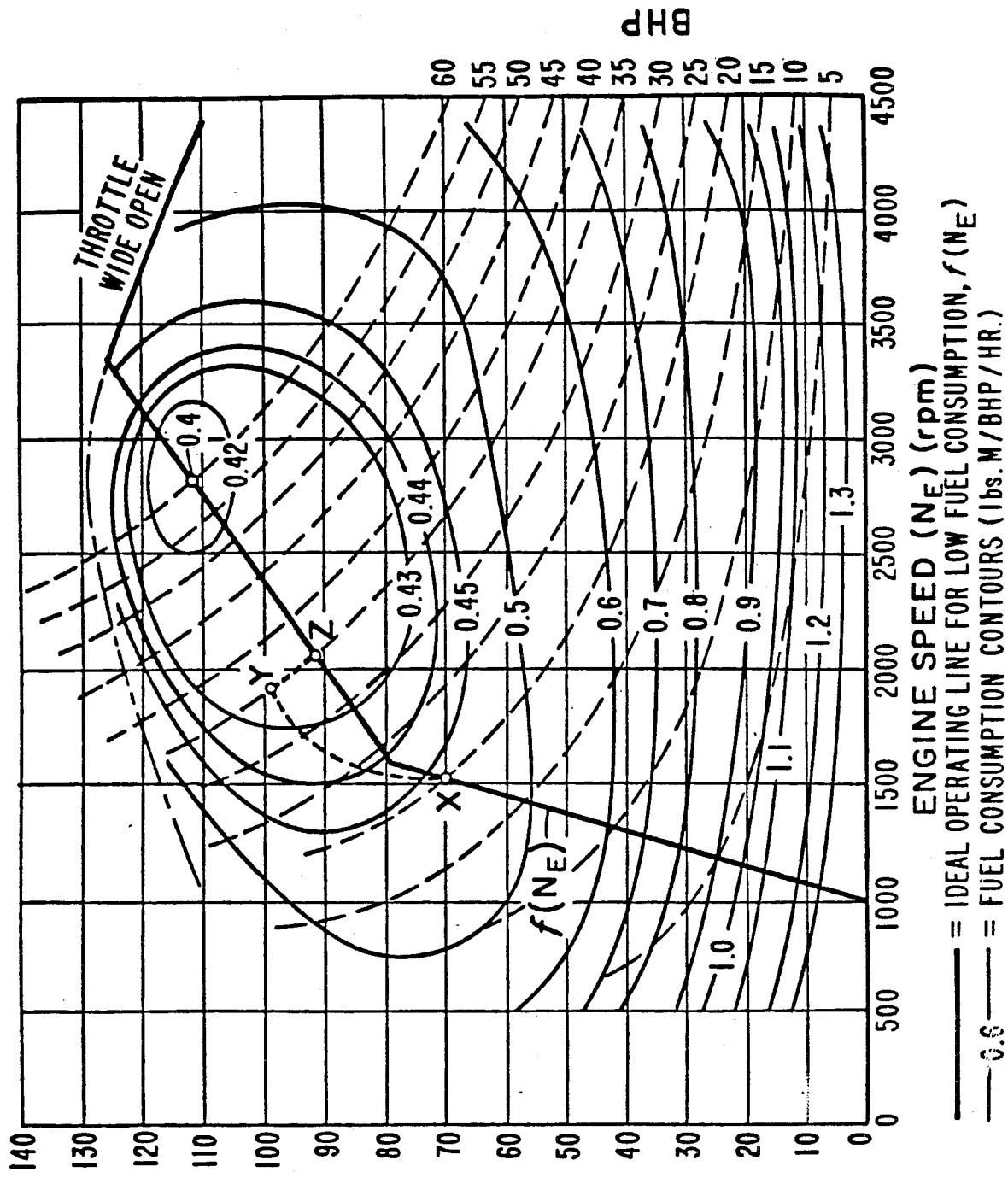
FIG. 1 is the performance map of a typical four cylinder passenger car engine having a displacement of approximately 2.5 liters.

It can be seen that the above described control scheme readily accomplishes the stated objectives. The responsiveness of the vehicle propulsion system is considerably smoothed so that bucking and lurching of the vehicle are avoided, and the accelerator pedal "feel" is modified so that it is similar to that of a vehicle equipped with a conventional automatic transmission. It should be noted that this control system is applicable to any CVT-equipped vehicle propulsion system wherein the engine has a relative steep torque-speed characteristic close to or along which engine operation desirably takes place, no matter what the range of engine speeds over which the steep portion of the torque-speed characteristic occurs. This "critical speed range" may be, for example, a low speed range, such as the one described above in connection with FIG. 1, or a more comprehensive speed range over a major portion of the operating spectrum of the engine, as in the case of a turbocharged or supercharged engine. The "critical speed range" is defined generally as that range of engine speeds within which small changes in engine speed produce large changes in engine torque, to the extent that driveability and controllability of the vehicle are adversely affected due to extreme sensitivity to accelerator pedal inputs.

Various modifications of the invention will be apparent to those skilled in the art without departing from the true scope of the invention which is defined by the appended claims.

I claim:

1. In a system for controlling the operation of a vehicular propulsion system including an engine having a relatively steep torque-speed characteristic defined by a critical engine speed range, and a continuously variable ratio transmission coupled to said engine for delivering usable power therefrom, said control system including command means operatively coupled to said transmission and providing an input thereto for controlling the ratio thereof and thereby commanding a desired propulsion system performance, the improvement comprising attenuator means operatively coupled to said command means and said transmission for attenuating the output of said command means within said critical engine speed range, thereby decreasing the sensitivity of said command means and smoothing the responsiveness of the propulsion system, and the attenuator means includes means to control the amount of attenuation of said output dependent on the output of said command means.

2. A control system according to claim 1 wherein the attenuation of the output of said command means diminishes and approaches substantially zero as the output of said command means approaches a maximum.

3. A control system according to claim 2 wherein the attenuation of the output of said command means is defined by a parabolic function.

4. A control system according to claim 3 wherein the attenuated output of said command means, which is the input to said transmission, is given by:

$$V = \frac{1}{K_1 - R} \cdot a(\alpha + K_1 - 1 - R)$$

where,
V = the input to said transmission;
R = transmission ratio;
α = the output of the command means prior to attenuation; and
K = a constant.

5. A control system according to claim 1 wherein the attenuation of the output of said command means is a function of command means output and transmission ratio.

6. A control system according to claim 1 wherein said engine has fuel delivery means for delivering a variable quantity of fuel thereto, further comprising:
   actual propulsion system performance measuring means for measuring the actual performance of the propulsion system;
   ratio control means operatively coupled to said command means and said actual propulsion system performance measuring means for controlling the ratio of said transmission as a function of the desired propulsion system performance commanded by said command means and the measured actual propulsion system performance, the speed of said engine varying as a function of transmission ratio;
   fuel function means defining a desired fuel requirement for said engine in relation to engine operating speed;
   speed measuring means for measuring the speed of said engine; and
   fuel control means operatively coupled to said fuel function means and said fuel delivery means for controlling said fuel delivery means only in accordance with the fuel requirement defined by said fuel function means, so that the fuel delivered to said engine is determined only by the speed thereof.

7. A control system according to claim 6 wherein said ratio control means changes the ratio of said transmission at a rate which is proportional to the difference between the desired propulsion system performance and the actual propulsion performance.

8. In a method of controlling the operation of a vehicular propulsion system including an engine having a relatively steep torque-speed characteristic defined by a critical engine speed range, a continuously variable ratio transmission coupled to said engine for delivering usable power therefrom, and command means for commanding desired propulsion system performance, the method including controlling the ratio of said transmission by providing an input thereto from said command means, the improvement comprising attenuating the output of said command means within said critical engine speed range to decrease the sensitivity of said command means and smooth the responsiveness of the propulsion system, and controlling the amount of attenuation of said output in response to the output of said command means.

9. A method according to claim 8 wherein the attenuation of the output of said command means diminishes and approaches substantially zero as the output of said command means approaches a maximum.

10. A method according to claim 9 wherein the attenuation of the output of said command means is defined by a parabolic function.

11. A method according to claim 10 wherein the attenuated output of said command means, which is the input to said transmission, is given by:

$$V = \frac{1}{K_1 - R} \cdot a(\alpha + K_1 - 1 - R)$$

where,
V = the input to said transmission;
R = transmission ratio;
α = the output of the command means prior to attenuation; and
K = a constant.

12. A method according to claim 8 wherein the attenuation of the output of said command means is a function of command means output and transmission ratio.

13. A method according to claim 8 wherein said engine has fuel delivery means for delivering a variable quantity of fuel thereto, further comprising the steps of:
   measuring the actual performance of the propulsion system;
   controlling the ratio of said transmission as a function of the desired propulsion system performance commanded by said command means and said measured actual propulsion system performance, the speed of said engine varying as a function of transmission ratio;
   predetermining a fuel function defining desired fuel requirements for said engine in relation to engine operating speed;
   measuring the speed of said engine; and
   controlling said fuel delivery means only in accordance with said fuel function so that the fuel delivered to said engine is determined only by the speed thereof.

14. A method according to claim 13 wherein said ratio control means changes the ratio of said transmission at a rate which is proportional to the difference between the desired propulsion system performance and the actual propulsion system performance.

* * * * *